United States Patent [19]

Elberbaum

[11] Patent Number: 4,949,181

[45] Date of Patent: Aug. 14, 1990

[54] CLOSED CIRCUIT TELEVISION APPARATUS FOR REMOTELY CONTROLLING TELEVISION CAMERAS

[75] Inventor: David Elberbaum, Tokyo, Japan

[73] Assignee: Elbex Video, Ltd., Tokyo, Japan

[21] Appl. No.: 271,199

[22] Filed: Nov. 14, 1988

[30] Foreign Application Priority Data

Nov. 16, 1987 [JP] Japan .............................. 62-287548

[51] Int. Cl.$^5$ .............................................. H04N 7/18
[52] U.S. Cl. .................................... 358/210; 358/108
[58] Field of Search ........................ 358/210, 108, 181

[56] References Cited

U.S. PATENT DOCUMENTS 4,148,069 4/1979 Smiley et al. .................... 358/185 X
4,831,438 5/1989 Bellman, Jr. et al. ........... 358/210 X Primary Examiner—James J. Groody
Assistant Examiner—Victor R. Kostak
Attorney, Agent, or Firm—Helfgott & Karas

[57] ABSTRACT

A closed circuit television apparatus for a supervisory system comprises at least one imaging device which includes a remote-controllable television camera for generating video signals, a monitor receiving the video signals and displaying images corresponding to the received video signals, and a controller for generating composite control signals to control the television camera. The composite control signals have a higher frequency than that of the video signals. The imaging device further includes a receiver receiving the composite control signals, extracting the composite control signals by utilizing the difference in frequency between the received composite control signals and the video signals, and operating the television camera based on the extracted composite control signals.

6 Claims, 3 Drawing Sheets

CLOSED CIRCUIT TELEVISION APPARATUS FOR REMOTELY CONTROLLING TELEVISION CAMERAS

BACKGROUND OF THE INVENTION

1. Field of the Invention:

This invention relates to a closed circuit television apparatus such as a supervisory system, and more particularly to a closed circuit television apparatus for remotely controlling the operation and functions of television cameras.

2. Description of the Prior Art:

Generally, in a closed circuit television apparatus such as a supervisory system, at each of different places to be observed a remotely controllable television camera is located, and at a central supervisory station a monitor for receiving video signals from the individual television cameras, a controlling device or operating device for controlling the operation and functions of the television cameras, and a switching circuit for selecting one of the television cameras to be connected to the controlling device and the monitor are located. The operation and functions of each television camera, such as make-and-break of a power, make-and-break of a heater, make-and-break of a wiper, tilting, panning, focusing and zooming, is controlled by a control signal supplied from a controlling device and each television camera transmits video signals to the central supervisory station.

However, since the conventional closed circuit television apparatus requires cables for transmitting the video signals and cables for transmitting the control signals, such many cables must be built between the central supervisory station and the individual television camera, thus resulting in a complicated and expensive system.

SUMMARY OF THE INVENTION

It is therefore an object of the present invention to provide a closed circuit television apparatus in which video signals and control signals can be transmitted by utilizing common cables.

According to a first aspect of the present invention, a closed circuit television apparatus comprises at least one imaging means including a remote-controllable television camera for generating video signals, a monitoring means for receiving the video signals to display images corresponding to the received video signals, and a controlling means for generating composite control signals to control the television camera. The composite control signals have a higher frequency than that of the video signals. The imaging means further includes a receiving means for receiving the composite control signals, for extracting the composite control signals by utilizing the difference in frequency between the received composite control signals and the video signals, and for operating the television camera based on the extracted composite control signals.

With such apparatus according to the present invention, since the frequency of the composite control signals transmitted from the controlling means to the imaging means is higher than that of the video signals transmitted from the television camera to the monitoring means, the composite control signals and video signals can be transmitted by utilizing common transmitting lines.

According to a second aspect of the present invention, a closed circuit television apparatus comprises a plurality of imaging means each including a remote-controllable television camera for generating video signals, monitoring means for receiving the video signals to display images corresponding to the video signals, a controlling means for generating composite control signals to control said television camera, and a switching means for switching the imaging means to be connected with the monitoring means and the controlling means. The composite control signals have a higher frequency than that of the video signals and are supplied to a circuit portion connecting both of the switching means and the monitoring means. The imaging means further includes a receiving means for receiving the composite control signals, for extracting the composite control signals by utilizing the difference in frequency between the received composite control signals and the video signals, and for operating the television camera based on the extracted composite control signals.

With such apparatus according to the present invention, since the composite control signal is supplied to the circuit portion connected both of the switching means and the monitoring means, the monitoring means and controlling means are simultaneously and correctly connected to the same imaging means. Therefore, the attendant can control the television camera in a desired condition while watching the picture corresponding the video signal transmitted from the imaging means.

BRIEF DESCRIPTION OF THE DRAWINGS

The foregoing and other objects and features of the invention will become apparent from the following description of preferred embodiments of the invention with reference to the accompanying drawings, in which.

DETAILED DESCRIPTION OF THE PREFERRED EMBODIMENTS

Figure 1:
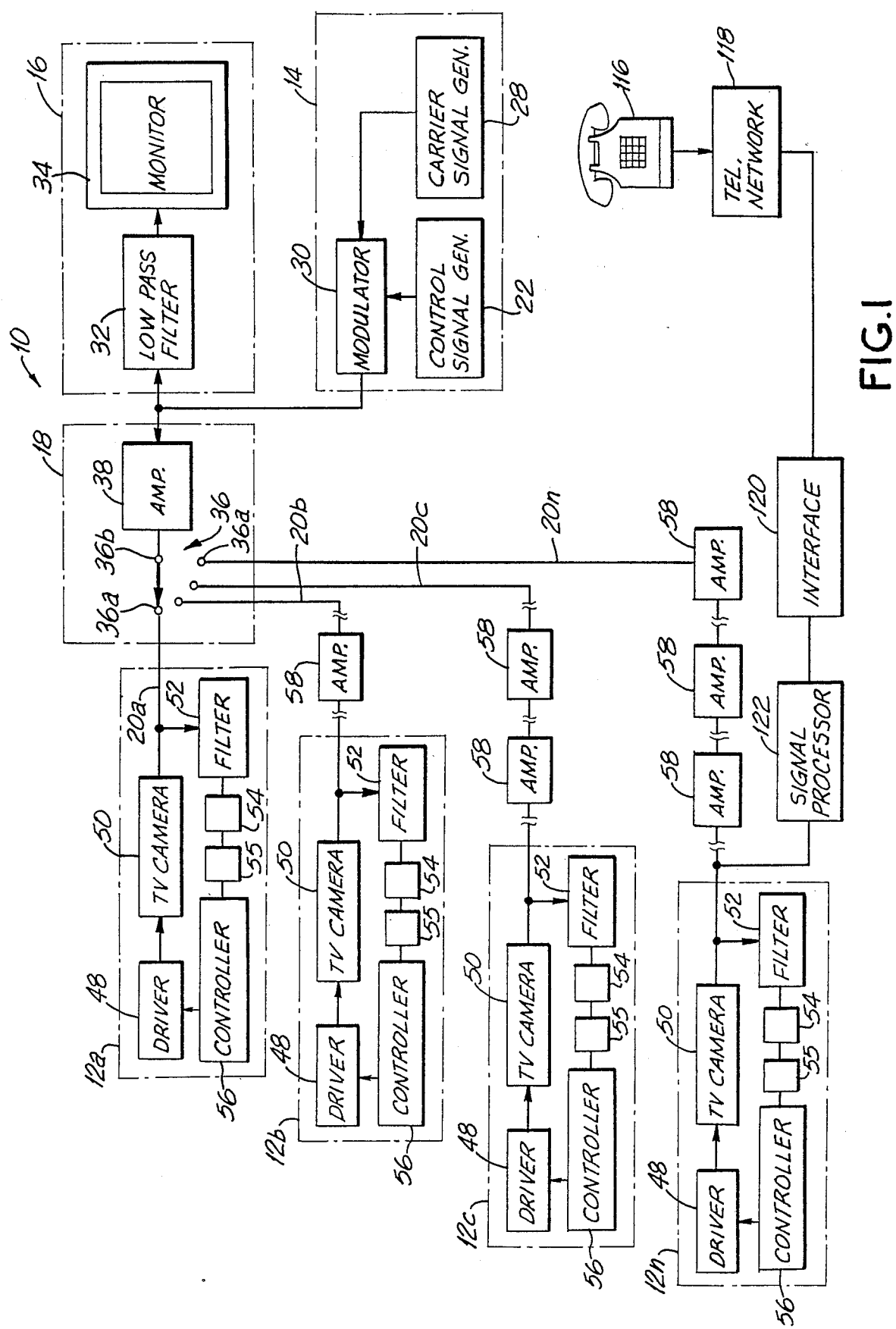
FIG. 1 is a block diagram of an electric circuit showing an embodiment of a closed circuit television apparatus according to the present invention.

FIG. 1 shows a closed circuit television apparatus 10, in which a plurality of imaging devices 12a, 12b, 12c . . . 12n each including a television camera for generating video signals are located at each of a plurality of different places to be observed. At the other end, at a central supervisory station, an operating device or controlling device 14 for controlling the operation and functions of the individual imaging devices 12a, 12b, 12c . . . 12n, a monitoring device 16 for receiving the video signals from a selected one of the engaging devices 12a, 12b, 12c . . . 12n, a switching device 18 are located. The switching device 18 is disposed between the controlling device 14 and monitoring device 16 and the imaging devices 12a, 12b, 12c . . . 12n.

Between the central supervisory station and the individual places to be observed, cables 20a, 20b, 20c . . . and 20n corresponding to the imaging devices 12a, 12b, 12c . . . and 12n are built.

The video signal is a composite video signal which is composed by adding a composite synchronizing signal to an image signal.

The controlling device 14 includes a circuit 22 which generates control signals. The control signals have frequencies corresponding to various kinds of control or various control codes so as to control the functions and the coordinates of the television camera, such as make-and-break of a power, make-and-break of a heater, make-and-break of a wiper, tilt positioning, pan positioning, focus positioning and zoom positioning.

The control signal generating circuit 22 is a push-button-type telephone apparatus or a tone encoder (put on the market under the name such as "dual tone encoder" and "touch tone encoder") used in the push-botton-type telephone apparatus. The control codes "1", "2", "3" and "4", for example, are allotted to power-on command, power-off command, wiper-on command, and wiper-off command. The control codes may be one or two figures and can be entered by depressing ten keys of the push-button-type telephone apparatus or tone encoder.

The control signal output from the control signal generating circuit 22 is composite signal of two different kinds of signals having different frequencies according to the control codes. This composite signal is composed of one of four signals of different frequencies f1, f2, f3, f4 and one of other four signals of different frequencies f5, f6, f7, f8. The composite signal is determined by depressing the ten keys of the push-button-type telephone apparatus.

Alternatively, the control signal generating circuit 22 may be a plurality of switches as a substitute for the push-button switch of the tone encoder. Also, in this case, the control signal is a composite signal of two different signals according to the control codes.

Figure 2:
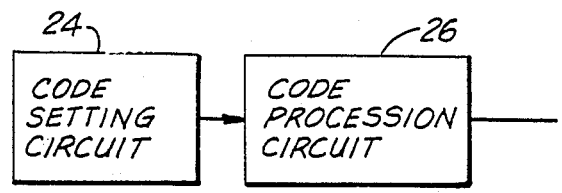
FIG. 2 is a block diagram of the electric circuit showing an embodiment of a control signal generating circuit used in the apparatus of FIG. 1.

The control signal generating circuit 22, as shown in FIG. 2, may comprise a control code setting circuit 24 and a processing circuit 26 for generating the control signal having a frequency corresponding to the control code set in the setting circuit 24. The setting circuit 24 may be a key-pad, a plurality of switches, a joy-stick, etc. Otherwise the setting circuit 24 may be a remote-control device of radio system or IR system. The processing circuit 26 may be a dial tone encoder or a computer serial coder.

The control signal may be a single kind of signals different in frequency according to the control codes, or may be a composite signal of more than three signals.

The control signal generated by the control signal generating circuit 22 is supplied to a modulating circuit 28. The modulating circuit 28 modulates the frequency of a carrier signal, which is supplied from a carrier signal generating circuit 30, by the control signal. The carrier signal generated in the circuit 30 has a constant frequency adequately higher than the maximum frequency of the video signal transmitted from the respective imaging device 12a, 12b, 12c ... 12n to the monitoring device 16.

The modulated carrier signal is transmitted from the circuit portion connecting the monitoring device 16 and the switching device 18 to a predetermined one of the imaging devices as a composite control signal via the switching device 18 and the transmitting line selected by the switching device 18. The frequency of the modulated carrier signal is higher than the maximum frequency of the video signal transmitted from each imaging device 12a, 12b, 12c ... 12n to the monitoring device 16.

When the frequency of the control signal is higher than that of the video signal, the composite control signal to be transmitted from the controlling device 14 to the imaging device may be the control signal itself.

The monitoring device 16 includes a television receiver or monitor 34 located at the output side of a low-pass filter 32 which allows the video signals to pass and prevents the composite control signals from passing. Since the composite control signal or modulated carrier signal entered to the monitoring device 16 is eliminated by the filter 32, the picture or image reproduced on the monitor 34 cannot be affected by the composite control signal even if the video signal and the composite control signal are transmitted through a common transmitting line.

The switching device 18 includes a switch 36 having a plurality of 1st contacts 36a independently connected to the transmitting lines 20a, 20b, 20c ... 20n and a 2nd contact 36b adapted to be selectively connected to one of the 1st contacts 36a, and an amplifying circuit 38 connected to the 2nd contact 36b of the switch 36, the monitoring device 16 and the controlling device 14. The switch 36 may be a mechanical or electronical switch.

Figure 3:
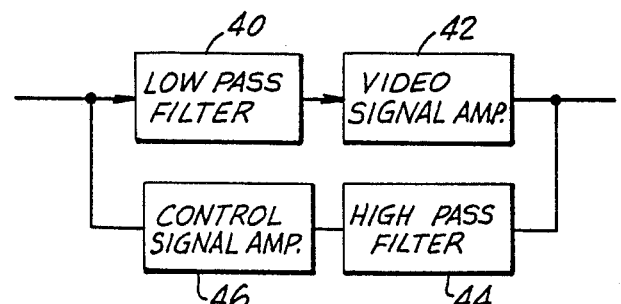
FIGS. 3 through 7 are block diagrams showing an embodiment of an amplifying circuit, respectively.

The amplifying circuit 38 amplifies the video signal and the composite control signal individually. The amplifying circuit 38 may be a two-way relay having two series-connection circuits connected in parallel, as shown in FIG. 3. One of the series-connection circuits includes a low-pass filter 40 which allows the video signal to pass and prevents the composite control signal from passing, and an amplifier 42 disposed as the output side of the filter 40. The other series-connection circuit includes a high-pass filter 44 which allows the composite control signal to pass and prevents the video signal from passing, and an amplifier 46 disposed at the output side of the filter 44.

The output signal of the controlling device 14 may be supplied to between the switch 36 and the amplifying circuit 38, in which case the filter 32 may be excluded from the monitoring device 16 if the amplifying circuit 38 is as shown in FIG. 3.

Each imaging device 12a, 12b, 12c ... 12n includes a television camera 50 for generating the video signal corresponding to the observed object or scan, and for transmitting the video signal to an asigned transmitting line. The functions and the coordinates of the televison camera 50, such as make-and-break of a power, make-and-break of a heater, make-and-break of a wiper, tilt positioning, pan positioning, focus positioning and zoom positioning, are controlled by a driver 48.

The composite control signal transmitted to the imaging device is extracted by a high-pass filter 52 allowing the composite control signal to pass, and is supplied to a demodulator 54 connected to the output side of the filter 52.

The demodulator 54 demodulates the control signal from the composite control signal or modulated carrier signal and supplies the demodulated control signal to a decoder 55 such as a touch tone decoder. The decoder 55 decodes the demodulated control signal and supplies to a function controller 56 the signal corresponding to the instructions or control codes from the controlling device 14.

The controller 56 controls the driver 48 based on the signal supplied from the decoder 54, whereby the television camera 50 is remotely controlled and operated by the controlling device 14.

If the distance between the central supervisory station and the individual places to be observed is long, it is preferable that one or more amplifying circuits 58 for relay are located at a midportion of the transmitting line 20. The amplifying circuits 58 may be those similar to the amplifying circuits 38.

According to the closed circuit television apparatus 10, it is possible to connect a predetermined imaging device simultaneously to both of the controlling device 14 and the monitoring device 16 by connecting the 2nd contact 36b of the switching device to one of the 1st contacts 36a corresponding to the predetermined imaging device. Therefore, viewing the picture displayed on the monitor 34 of the monitoring device 16, the attendent at the central supervisory station can control, by the controlling device 14, the operation condition of the television camera of the imaging device that is connected to the controlling device 14 and the monitoring device 16.

FIGS. 4 through 7 illustrate respectively an embodiment of the amplifying circuit 58, each comprising a processing circuit for the video signals and another processing circuit for the composite control signals, the two processing circuits being connected in parallel with each other.

Figure 4:
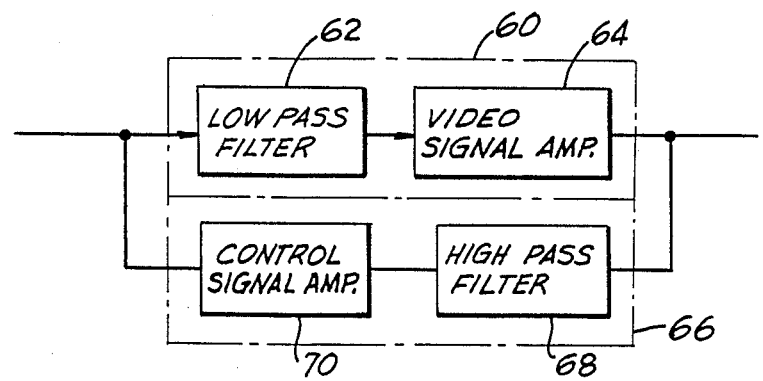

A video signal processing circuit 60 of the amplifying circuit shown in FIG. 4 includes a low-pass filter 62 which allows the video signal to pass and prevents the composite control signal from passing, and a video signal amplifier 64 disposed at the output side of the filter 62. On the other hand, a composite control signal processing circuit 66 includes a high-pass filter 68 which allows the composite control signal to pass and prevents the video signal from passing, and an amplifier 70 disposed at the output side of the filter 68. The amplifying circuit of FIG. 4 may be disposed most adjacent to the imaging device.

Figure 5:
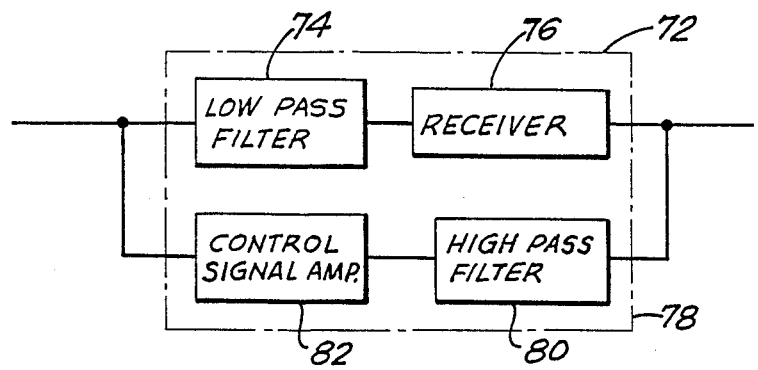

A video signal processing circuit 72 of the amplifying circuit shown in FIG. 5 includes a low-pass filter 74 which allows the video signal to pass and prevents the composite control signal from passing, and a video signal receiver 76 disposed at the output side of the filter 74. On the other hand, a composite control signal processing circuit 78, like the processing circuit 66 of FIG. 4, includes a high-pass filter 80 which allows the composite control signal to pass and prevents the video signal from passing, and an amplifier 82 disposed at the output side of the filter 80. The amplifying circuit of FIG. 5 may be disposed most adjacent to the switching device 18.

Figure 6:
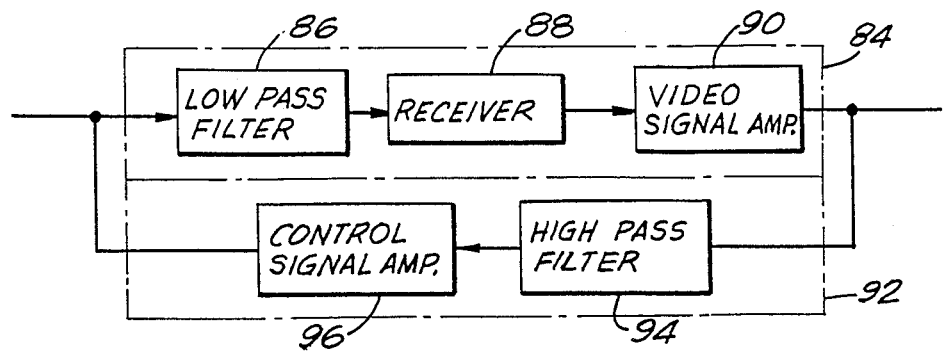

A video signal processing circuit 84 of the amplifying circuit of FIG. 6 includes a low-pass filter 86 which allows the video signal to pass and prevents the composite control signal from passing, a video signal receiver 88 disposed at the output side of the filter 86, and a video signal amplifier 90 disposed at the output side of the receiver 88. On the other hand, a composite control signal processing circuit 92, like the processing circuit 66 of FIG. 4, includes a high-pass filter 94 which allows the composite control signal to pass and prevents the video signal from passing, and an amplifier 96 disposed at the output side of the filter 94. The amplifying circuit of FIG. 6 may be disposed between the position of the amplifying circuit of FIG. 4 and the position of the amplifying circuit of FIG. 5.

Figure 7:
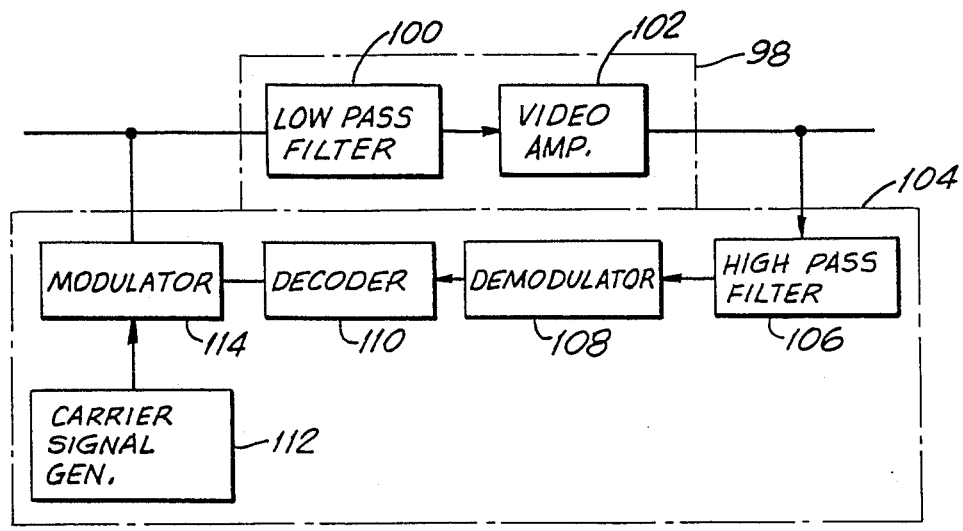

A video signal processing circuit 98 of the amplifying circuit of FIG. 7 includes a low-pass filter 100 which allows the video signal to pass and prevents the composite control signal from passing, and a video signal amplifier 102 disposed at the output side of the receiver 100. On the other hand, a composite control signal processing circuit 104 has a function of demodulating the control signal, and a function of modulating a fresh carrier signal by the demodulated control signal. For this purpose, the composite control signal processing circuit 104 includes a high-pass filter 106 which allows the composite control signal to pass and prevents the video signal from passing, a demodulator 108 for demodulating the control signal from the output signal of the filter 106, a decoder 110 for decoding the demodulated control signal, a carrier signal generating circuit 112, and a modulating circuit 114 for modulating the frequency of the carrier signal by the output signal of the decoder 110. The frequency of the carrier signal generated from the carrier signal generating circuit 112 is identical with the frequency of the carrier signal generated from the carrier signal generating circuit 28 of FIG. 1.

In the embodiments of FIGS. 4 through 7, the video signal receiver 76, 88 or 100 may be a carrier which is put on the market for a video receiver for telephone line, and the video signal amplifier 64, 90 or 102 may be a circuit which is put on the market for a video transmitter for telephone line.

The amplifying circuits of FIGS. 4 through 7 may be used as the amplifying circuit 38 of the switching device 18.

As shown in FIG. 1, the telephone apparatus 60 may be used as the controlling device so as to transmit the control signal from the telephone apparatus 116 via a telephone network 118. In such arrangement, between the imaging device and the telephone network 118 are disposed an interface 120, and a signal processing circuit 122 for generating the same signal as the modulated carrier signal generated by the controlling device 14 based on the output signal of the interface 120. The signal processing circuit 122 may includes a circuit for demodulating the control signal generated by the telephone apparatus 116 based on the output signal of the interface 120, a circuit for generating the same carrier signal as that generated by the carrier signal generating circuit 28 of the controlling device 14, and a circuit for modulating the frequency of the carrier signal by the demodulated control signal.

What is claimed is:

1. A closed circuit television apparatus comprising:
at least one imaging means including a remote-controllable television camera for generating video signals;
monitoring means for receiving said video signals to display images corresponding to the received video signals; and
controlling means for generating composite control signals to control said television camera;
said composite control signals having a higher frequency than that of said video signals,
said imaging means further including receiving means for receiving said composite control signals, for extracting said composite control signals by utilizing the difference in frequency between the received composite control signals and said video signals, and for operating said television camera based on the extracted composite control signals,
said controlling means including a circuit for generating a control signal having a frequency corresponding to a kind of control, a circuit for generating a carrier signal having a frequency higher than the frequency of said video signal, and a modulating circuit for modulating said carrier signal by said control signal and for transmitting the modulate carrier signal, said receiving means including a filter for receiving the modulated carrier signal transmitted from said controlling means and for extracting the modulated carrier signal, a demodulator for demodulating said control signal from the extracted carrier signal, a decoder for decoding the demodulated control signal, a driver for driving said television camera, and a controller for controlling said driver based on the output signal of said decoder.

2. A closed circuit television apparatus according to claim 1, wherein said monitoring means includes a circuit for eliminating said composite control signal from the signal entered to said monitoring means, and a monitor for reproducing the image corresponding to said video signal based on an output signal of said eliminating circuit.

3. A closed circuit television apparatus according to claim 1, wherein said video signal and composite control signal are transmitted through a common transmission line.

4. A closed circuit television apparatus according to claim 3 wherein an amplifying means for relay is disposed in said transmission line and includes an amplifier for said video signal and an amplifier for said composite control signal.

5. A closed circuit television apparatus comprising:
a plurality of imaging means each including a remote-controllable television camera for generating video signals;
monitoring means for receiving said video signals to display images corresponding to the received video signals;
controlling means for generating composite control signals to control said television camera; and
switching means for switching said imaging means to be connected with said monitoring means and controlling means;
said composite control signals having a higher frequency than that of said video signals and being supplied to a circuit portion connecting both of said switching means and said monitoring means,
said imaging means further including receiving means for receiving said composite control signals, for extracting said composite control signals by utilizing the difference in frequency between said received composite control signals and said video signals, and for operating said television camera based on the extracted composite control signals,
said switching means including a switch having a plurality of 1st contacts independently connected to said imaging means, and a 2nd contact connected to both of said monitoring means and said controlling means and adapted to be selectively connected to one of said 1st contacts.

6. A closed circuit television apparatus comprising:
a plurality of imaging means each including a remote-controllable television camera for generating video signals;
monitoring means for receiving said video signals to display images corresponding to the received video signals;
controlling means for generating composite control signals to control said television camera; and
switching means for switching said imaging means to be connected with said monitoring means and controlling means;
said composite control signals having a higher frequency than that of said video signals and being supplied to a circuit portion connecting both of said switching means and said monitoring means,
said imaging means further including receiving means for receiving said composite control signals, for extracting said composite control signals by utilizing the difference in frequency between said received composite control signals and said video signals, and for operating said television camera based on the extracted composite control signals,
said switching means including a switch having a plurality of 1st contacts independently connected to said imaging means and a 2nd contact adapted to be selectively connected to one of said 1st contacts, and an amplifying circuit connected at one end to said 2nd contact of said switch and at the other end to said monitoring means and said controlling means.

* * * * *